C. Parham,

Fruit Masher,

Nº 44,742.  Patented Oct. 18, 1864.

UNITED STATES PATENT OFFICE.

CHARLES PARHAM, OF PHILADELPHIA, PENNSYLVANIA.

IMPROVED FRUIT AND VEGETABLE PRESS.

Specification forming part of Letters Patent No. 44,742, dated October 18, 1864.

*To all whom it may concern:*

Be it known that I, CHARLES PARHAM, of the city and county of Philadelphia, and State of Pennsylvania, have invented certain new and useful Improvements in Presses for Pressing the Juice from Fruit or Vegetables; and I do hereby declare the following to be a full, clear, and exact description of the same, reference being had to the accompanying drawings, making a part of this specification, in which—

Figure 1:
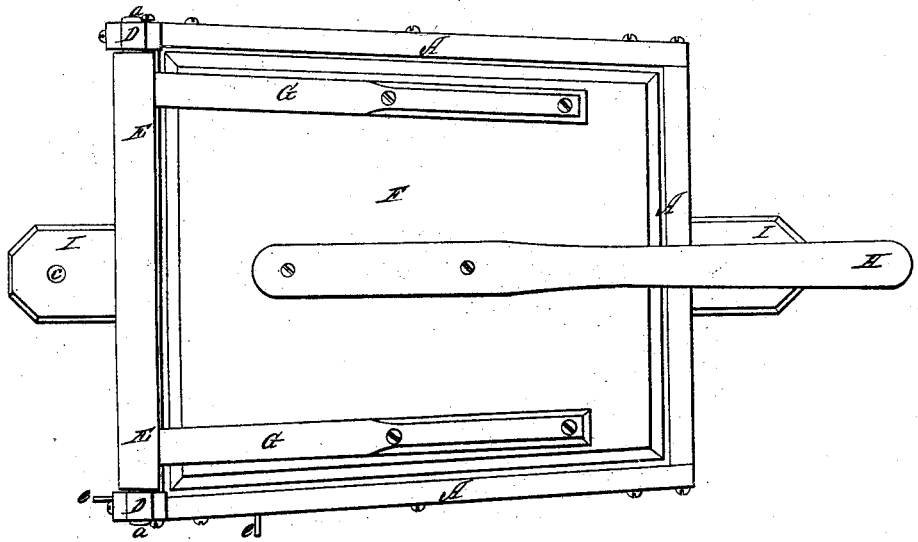
Figure 2:
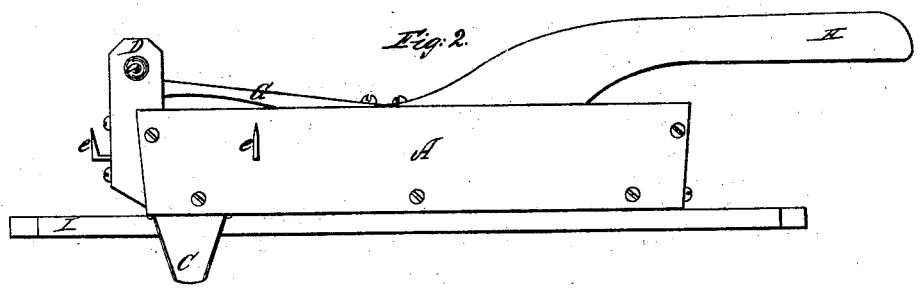
Figure 3:
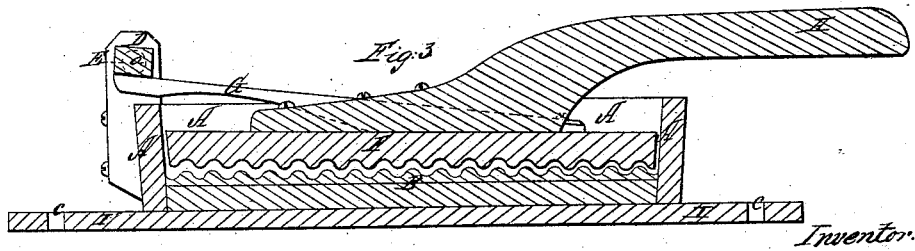

Figure 1 represents a top plan; Fig. 2 represents a side elevation, and Fig. 3 represents a longitudinal vertical section through the same.

Similar letters of reference, where they occur in the separate figures, denote like parts of the press in all the drawings.

My invention consists in a portable hand-press for pressing juices from fruit, vegetables, &c., as will be hereinafter explained.

A represents a shallow box, the bottom B of which is corrugated, grooved, or channeled in the inside, so as to conduct the expressed juices to some general avenue or exit; or they may issue into side or end channels, so as to conduct the juices to any suitable exit, C. To one end of this shallow-box A are fastened proper boxes or bearings D, in which the journals $a$ of a shaft, E, are supported and may turn, and to which shaft E the lid or cover F of the press is attached by spring-arms G, or other elastic connection, so that the cover, which becomes in a measure the platen or follower of the press, may yield somewhat to the varying thickness of fruit or vegetables to be pressed or to the pulp remaining therein. The under or pressing surface of the cover may be corrugated, grooved, channeled, or roughened, so as to more securely hold the fruit or vegetables in place while being squeezed, and a handle or lever, H, is applied to the cover F to give more leverage and power upon the platen or follower.

I I are cleats or projections, by which the press may be fastened to the table or otherwise, by screws passing through the holes $c\ c$ therein.

$e\ e$ are hooks for holding a straining bag or cloth of any suitable material, said bag or cloth hanging under the spout C, so that the expressed juices will pass through it and leave the seeds, pulp, &c., in the bag or strainer.

The object of this press is to have a ready and convenient implement in a house for squeezing or expressing the juices from fruits or vegetables for making wines, jellies, sauces, or condiments. The press may be made of wood or of iron or other metal or parts of each, and if of iron or other metal, the surfaces next the fruit, vegetables, or their juices may be of enameled to prevent corrosion or imparting any foreign taste to the pressed article or their juices.

Having thus fully described my invention, what I claim therein as new, and desire to secure by Letters Patent, is—

1. The combination of the box or holder A with a hinged elastic or yielding cover F, as and for the purpose described.

2. In combination with the above, corrugating, grooving, or channeling the opposite faces of the receiver and the cover, as and for the purpose described.

CHAS. PARHAM.

Witnesses:
L. A. HUGHES,
G. H. GARDNER.